(12) United States Patent
Hsueh

(10) Patent No.: US 8,248,710 B2
(45) Date of Patent: Aug. 21, 2012

(54) PRISM TYPE LENS

(75) Inventor: Chun-Yu Hsueh, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 68 days.

(21) Appl. No.: 12/964,080

(22) Filed: Dec. 9, 2010

(65) Prior Publication Data

US 2012/0147481 A1    Jun. 14, 2012

(51) Int. Cl.
   *G02B 15/14* (2006.01)
   *G02B 5/04* (2006.01)
(52) U.S. Cl. .................... 359/695; 359/831
(58) Field of Classification Search .......... 359/668, 359/669, 695, 830, 831–837
   See application file for complete search history.

(56) References Cited

U.S. PATENT DOCUMENTS 7,751,124 B2 *   7/2010   Towner et al. ............ 359/669
7,839,571 B2 *  11/2010   Saita et al. ............... 359/618

FOREIGN PATENT DOCUMENTS

TW           M376769 U1    3/2010

* cited by examiner

*Primary Examiner* — Mohammed Hasan
(74) *Attorney, Agent, or Firm* — Apex Juris, pllc; Tracy M. Heims

(57) ABSTRACT

A prism type of lens includes a first reflection lens, at least a first lens group, a second reflection prism, at least a second lens group, a third reflection prism, and at least a third lens group sequentially arranged from an object side to an image side. Light is reflected by the reflection prisms to form a bent light axis. Therefore, the optical axis has three sections for the lens groups to move respectively. The bent light axis has a longer distance that the lens of the present invention may have a great zoom range.

10 Claims, 4 Drawing Sheets

PRISM TYPE LENS

BACKGROUND OF THE INVENTION

1. Field of the Invention

The present invention relates generally to a lens, and more particularly to a prism type lens.

2. Description of the Related Art

As an improvement of technology, many electronic products, such as cellular phone, videogame, PDA etc., are equipped with image capture device for people to record his/her everyday life.

A conventional lens for the image capture device is cylinder cam type lens which has a plurality of lens groups. The lens groups are adjusted for focusing. The lens groups of the cylinder cam type lens will be moved into the image capture device when people turn off the electronic product. As there may be too many lens groups to be moved, sometime the cylinder cam type lens is too big for some image capture devices.

An improved lens, a prism type lens, is provided to overcome the drawback of the cylinder cam type lens. Taiwan Utility Model Patent No. M376769 discloses a prism type lens including a plurality of lens groups received in an image capture device for reciprocation and a prism for total reflection to reflect incident light to the lens groups. The prism type lens equips the image capture device with no protruded lens that the image capture device may be smaller and lighter.

However, the prism type lens has a limitation in zoom range because the lens groups have to move along a straight path and there is insufficient distance for the lens groups to move. The zoom range may be enlarged by lengthening the optical axis. However, it will increase the size of the image capture device.

SUMMARY OF THE INVENTION

The primary objective of the present invention is to provide a prism type lens with a great zoom range.

According to the objective of the present invention, a prism type of lens includes a first reflection lens, at least a first lens group, a second reflection prism, at least a second lens group, a third reflection prism, and at least a third lens group sequentially arranged from an object side to an image side. Light is reflected by the reflection prisms to form a bent light axis. The optical axis has a first section between the first reflection prism and the second reflection prism, a second section between the second reflection prism and the third reflection prism, and a third section between the third reflection prism and the image side. The second section is substantially perpendicular to the first section and the third section is substantially perpendicular to the second section. The first lens group is in the first section, the second lens group is in the second section, and the third lens group 103 is in the third section.

DETAILED DESCRIPTION OF THE INVENTION

Figure 1:
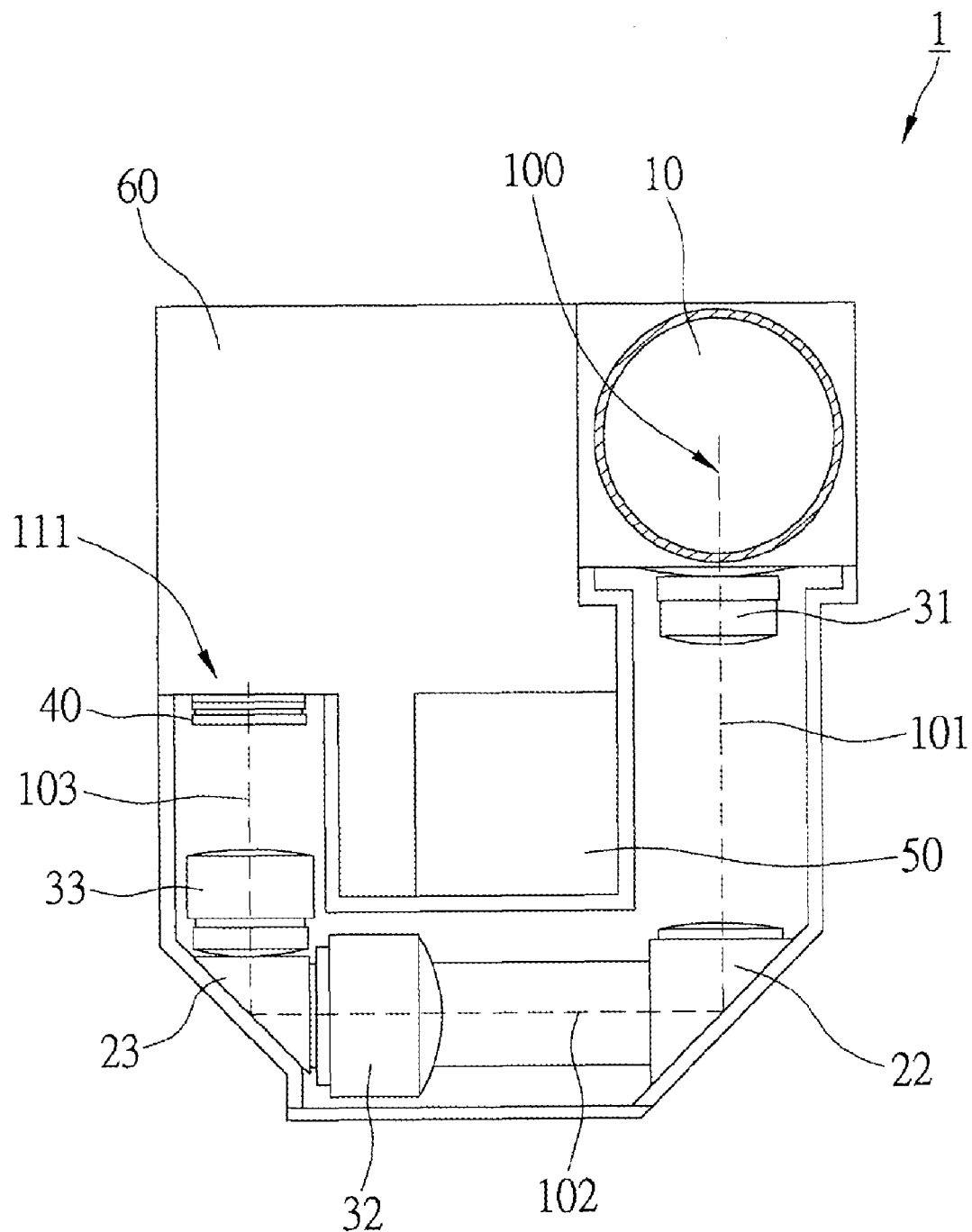
FIG. 1 is a perspective view of a first preferred embodiment of the present invention.
Figure 2:
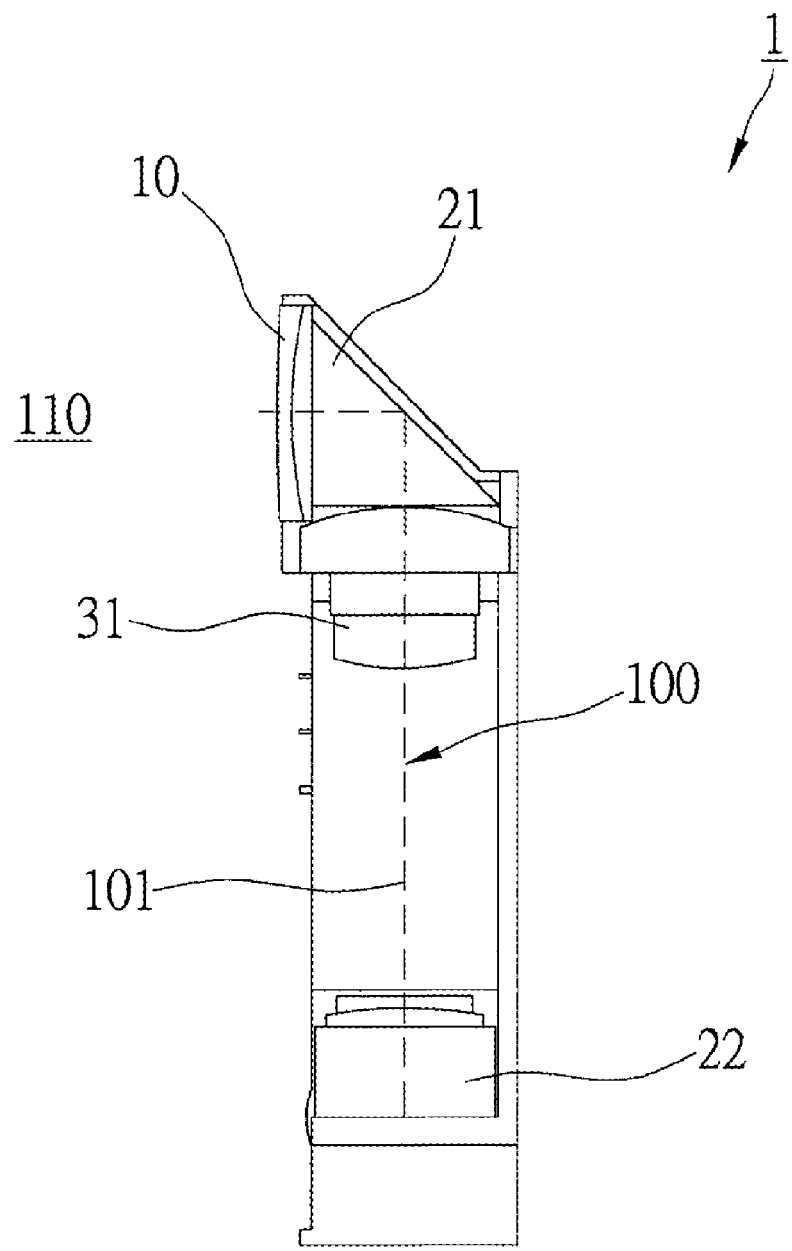
FIG. 2 is a sectional view of the first section of the light axis of the first preferred embodiment of the present invention.

As shown in FIG. 1 and FIG. 2, a prism type lens 1 of the first preferred embodiment of the present invention includes an optical lens 10, a first reflection lens 21, a first lens group 31, a second reflection prism 22, a second lens group 32, a third reflection prism 23, and a third lens group 33 sequentially arranged from an object side 110 to an image side 111. An image sensor 40 is provided at the image side 111.

The reflection prisms 21~23 reflect light for a 90 degrees turn. A U-shaped light axis 100 is formed by the reflection prisms 22~23. The light axis 100 is divided into a first section 101 between the first reflection prism 21 and the second reflection prism 22, a second section 102 between the second reflection prism 22 and the third reflection prism 23, and a third section 103 between the third reflection prism 23 and the image sensor 40. The first section 101 is perpendicular to the second section 102, and the third section 103 is perpendicular to the second section 102. With these reflection prisms 21~23 a length of the optical axis 100 is lengthened.

As shown in FIG. 1, the first lens group 31 is in the first section 101, the second lens group 32 is in the second section 102, and the third lens group 33 is in the third section 103. A driver 50 is provided to drive the lens groups 31, 32, and 33 for reciprocation in the first, second and third sections 101, 102, and 103 respectively. Distances for the lens groups 31, 32, 33 to move is longer because of the longer optical axis 100 that the lens 1 of the present invention may provide a great zoom range. In drawings, the lens groups each has a single lens, and in practice the lens group may have a single lens, multi-lenses, a single composite lens, or multi-composite lenses.

There is a space 60 within the three sections 101~103, and the driver 50 is provided in the space 60, which means the optical axis 100 around the driver 50 will not increase the size of the lens 1 by being lengthened. It also may provide controllers for focusing, optical shielding, or stabilization in the space 60 that the lens 1 of the present invention may have great zoom range and still remain small.

Figure 3:
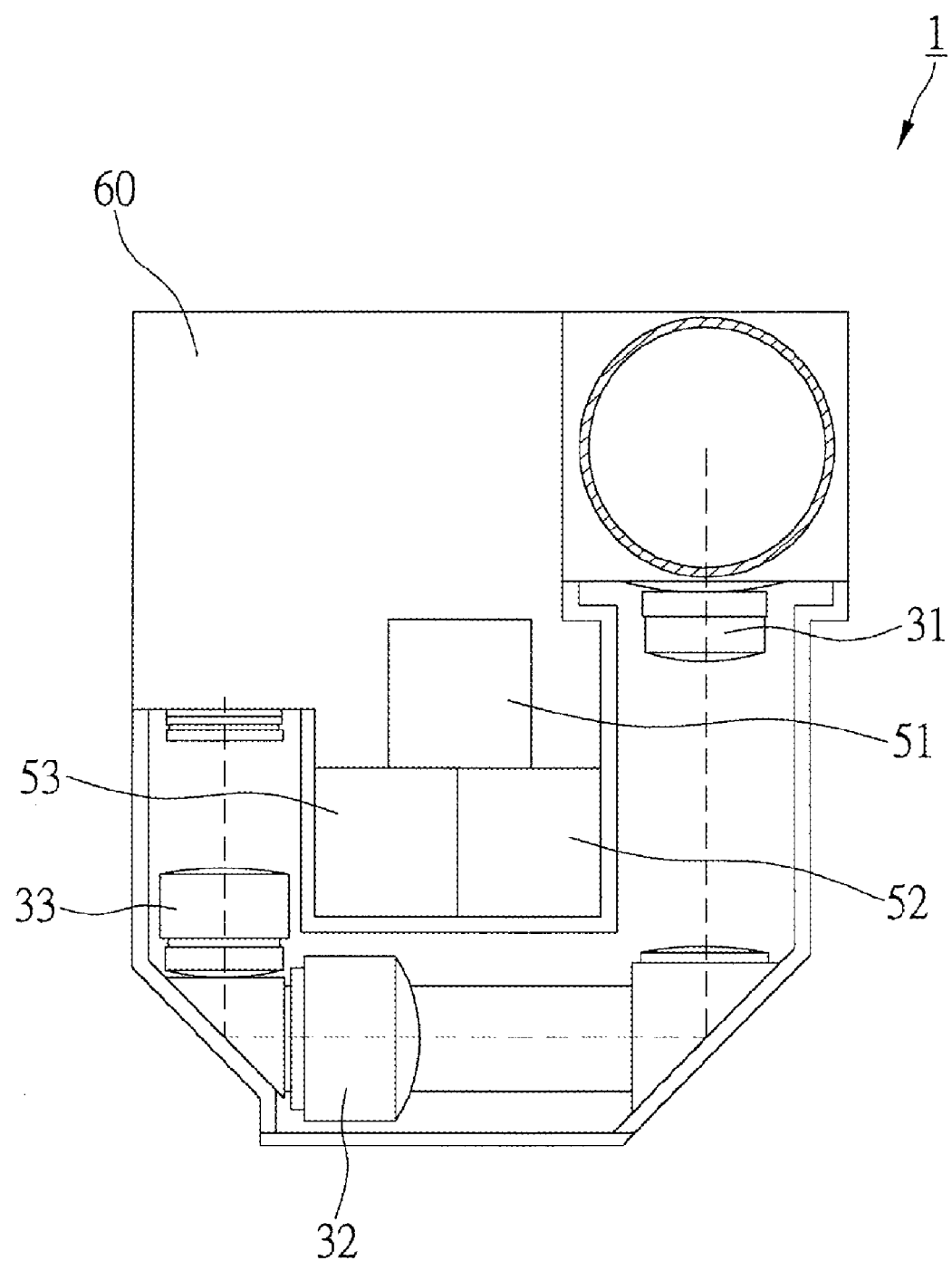
FIG. 3 is a sectional view of the first preferred embodiment of the present invention, showing three drivers moving the first, second, and third lens groups respectively.

FIG. 3 shows that three drivers 51~53 are received in the space 60 to drive the lens groups 31, 32, 33 respectively. Three drivers may provide a precise control on the lens groups, and it will not increase the size of the lens 1.

In conclusion, the present invention provides the reflection prisms to create a bent optical axis that the lens of the present invention may have a great zoom range. The present invention also uses the space within the bent optical axis to receive other elements that the lens may remain small.

Figure 4:
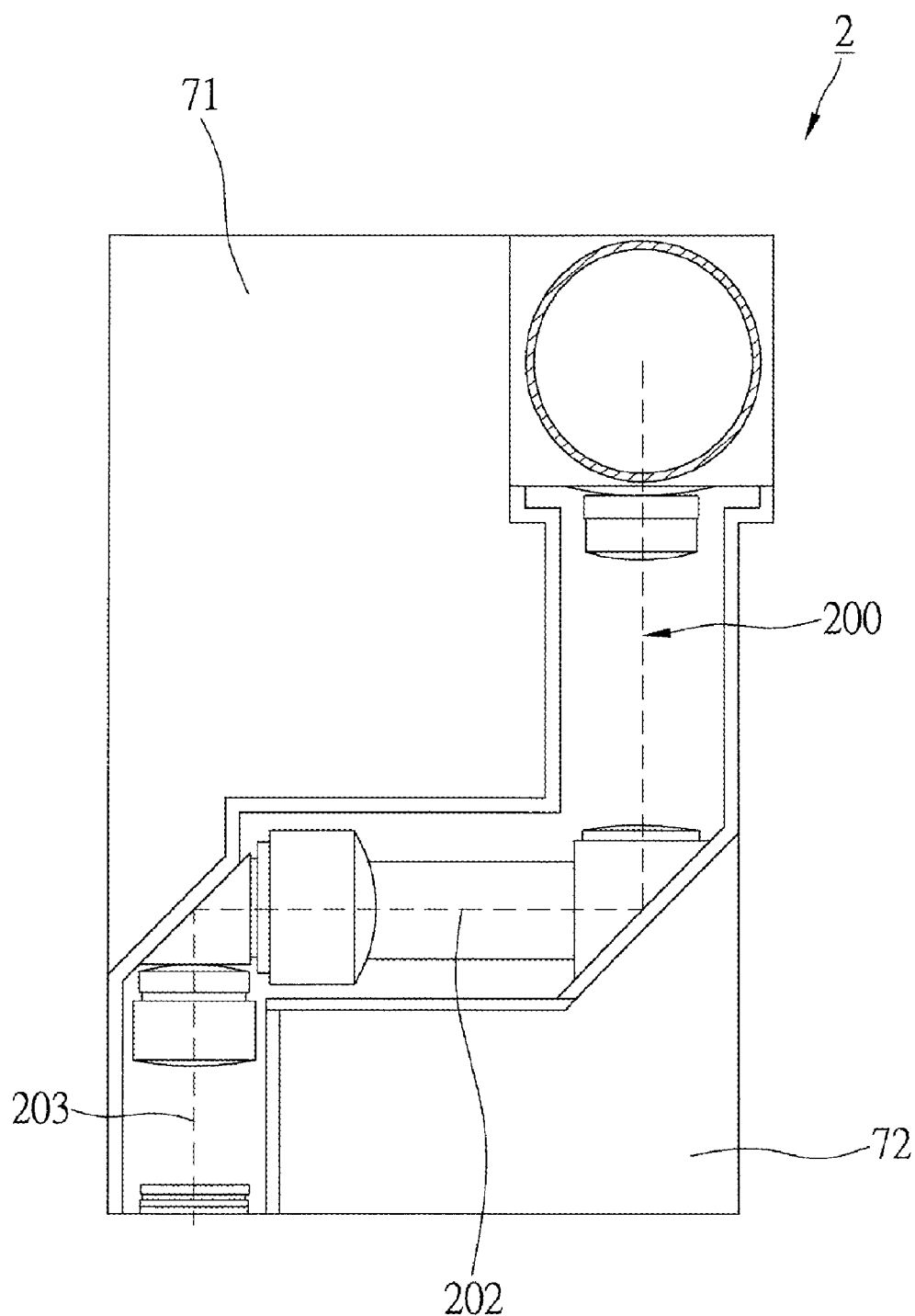
FIG. 4 is a sectional view of a second preferred embodiment of the present invention.

FIG. 4 shows a prism type lens 2 of the second preferred embodiment of the present invention, which is similar to the first preferred embodiment, except that the third reflection prism reflects light downward to form an S-shaped optical axis 200. The optical axis 200 still has three sections, and the third section 203 is downwards. The optical axis 200 divides the lens 2 that there are two spaces 71 and 72 in the lens 2, with the space 71 above the second section 202, and the space 72 under the second section 202. The spaces 71 and 72 receive more devices therein. For some reasons, some devices cannot be too close to other devices because it may generate interference or other problems. The spaces 71 and 72 may provide sufficient space for such devices.

The description above is a few preferred embodiments of the present invention and the equivalence of the present invention is still in the scope of claim construction of the present invention.

What is claimed is:

1. A prism type of lens, comprising a first reflection lens, at least a first lens group, a second reflection prism, at least a second lens group, a third reflection prism, and at least a third lens group sequentially arranged from an object side to an image side;

wherein light is reflected by the reflection prisms to form a bent light axis, which has a first section between the first reflection prism and the second reflection prism, a second section between the second reflection prism and the third reflection prism, and a third section between the third reflection prism and the image side;

wherein the second section is substantially perpendicular to the first section and the third section is substantially perpendicular to the second section;

wherein the first lens group is in the first section, the second lens group is in the second section, and the third lens group is in the third section.

2. The prism type of lens as defined in claim 1, further comprising a driver to drive the first lens group for reciprocation along the first section of the optical axis.

3. The prism type of lens as defined in claim 2, wherein a space is formed by the optical axis to receive the driver therein.

4. The prism type of lens as defined in claim 1, further comprising a driver to drive the second lens group for reciprocation along the second section of the optical axis.

5. The prism type of lens as defined in claim 4, wherein a space is formed by the optical axis to receive the driver therein.

6. The prism type of lens as defined in claim 1, further comprising a driver to drive the third lens group for reciprocation along the third section of the optical axis.

7. The prism type of lens as defined in claim 6, wherein a space is formed by the optical axis to receive the driver therein.

8. The method as defined in claim 1, further comprising a driver to drive the first lens group, the second lens group and the third lens group for reciprocation along the first section, the second section and the third section of the optical axis respectively.

9. The method as defined in claim 8, wherein a space is formed by the optical axis to receive the driver therein.

10. The method as defined in claim 1, further comprising an optical lens on the optical axis which is closer to object side than the first reflection prism.

* * * * *